(12) United States Patent
Maienschein

(10) Patent No.: US 10,571,006 B2
(45) Date of Patent: Feb. 25, 2020

(54) DEVICE FOR TRANSMITTING TORQUE

(71) Applicant: Schaeffler Technologies AG & Co. KG, Herzogenaurach (DE)

(72) Inventor: Stephan Maienschein, Baden-Baden (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 104 days.

(21) Appl. No.: 15/579,485

(22) PCT Filed: May 25, 2016

(86) PCT No.: PCT/DE2016/200250
§ 371 (c)(1),
(2) Date: Dec. 4, 2017

(87) PCT Pub. No.: WO2016/192726
PCT Pub. Date: Dec. 8, 2016

(65) Prior Publication Data
US 2018/0149250 A1    May 31, 2018

(30) Foreign Application Priority Data
Jun. 5, 2015    (DE) .................. 10 2015 210 364

(51) Int. Cl.
*F16H 45/02*    (2006.01)

(52) U.S. Cl.
CPC ..... *F16H 45/02* (2013.01); *F16H 2045/0205* (2013.01); *F16H 2045/0247* (2013.01);
(Continued)

(58) Field of Classification Search
CPC ............. F16H 45/02; F16H 2045/0205; F16H 2045/0247; F16H 2045/0273; F16H 2045/0278; F16H 2045/0294
See application file for complete search history.

(56) References Cited

U.S. PATENT DOCUMENTS

| 2,943,516 | A | * | 7/1960 | Herndon | ................. F16D 33/00 |
| | | | | | 192/3.23 |
| 4,041,701 | A | * | 8/1977 | Goto | ....................... F16H 61/14 |
| | | | | | 192/3.3 |
| 9,752,667 | B2 | * | 9/2017 | Depraete | ................. F16H 45/02 |
| 9,803,735 | B2 | * | 10/2017 | Lindemann | ............. F16H 45/02 |

(Continued)

FOREIGN PATENT DOCUMENTS

| CN | 105387126 | A | 3/2016 |
| DE | 102014224114 | A1 | 6/2015 |

(Continued)

OTHER PUBLICATIONS

International Search Report for PCT/DE2016/200250; 2 pgs; dated Sep. 16, 2016 by European Patent Office.

*Primary Examiner* — David R Morris
(74) *Attorney, Agent, or Firm* — Lekeisha M. Suggs

(57) ABSTRACT

A device for transmitting torque comprising a pump wheel and a turbine wheel arranged axially offset from each other on a rotation axis is disclosed. The pump wheel and the turbine wheel can be hydrodynamically coupled to each other by a fluid. The device may also include a first friction element attached to the pump wheel and configured to transmit torque and a second friction element attached to the turbine wheel and configured to transmit torque. The friction elements are configured to be pressed against each other axially to produce a frictional engagement. The first friction element or the second friction element may be attached to the pump wheel or the turbine wheel, respectively, in an axially movable manner.

7 Claims, 5 Drawing Sheets

(52) U.S. Cl.
CPC ........... *F16H 2045/0278* (2013.01); *F16H 2045/0294* (2013.01)

(56) References Cited

U.S. PATENT DOCUMENTS

| | | | |
|---|---|---|---|
| 10,151,376 B2 * | 12/2018 | Saleh | F16H 41/28 |
| 2015/0152951 A1 * | 6/2015 | Rentfrow | F16H 45/02 192/3.29 |
| 2016/0153534 A1 * | 6/2016 | Lindemann | F16H 45/02 192/3.28 |
| 2016/0160975 A1 * | 6/2016 | Depraete | F16H 45/02 192/3.29 |
| 2018/0291992 A1 * | 10/2018 | Saleh | F16H 41/28 |

FOREIGN PATENT DOCUMENTS

| | | | |
|---|---|---|---|
| FR | 2317556 A1 | 2/1977 | |
| FR | 2428188 A1 | 1/1980 | |
| JP | H11315904 A | 11/1999 | |
| WO | 9747901 A1 | 12/1997 | |

\* cited by examiner

DEVICE FOR TRANSMITTING TORQUE

CROSS-REFERENCE TO RELATED APPLICATIONS

This application is the U.S. National Phase of PCT Appln. No. PCT/DE2016/200250 filed May 25, 2016, which claims priority to DE 10 2015 210 364.1 filed Jun. 5, 2015, the entire disclosures of which are incorporated by reference herein.

TECHNICAL FIELD

The present disclosure relates to a device for transmitting torque. In particular, this disclosure relates to a hydrodynamic torque converter with an integrated bridging clutch. A hydrodynamic torque converter comprises a pump wheel and a turbine wheel which are mounted so as to be rotatable about a common rotation axis. By means of a fluid, the two wheels are coupled together hydrodynamically so that a torque can be transmitted when the two wheels rotate about the rotation axis with different rotation speeds. In order to avoid flow losses, a bridging clutch may be used which is closed at higher rotation speeds and can reduce a speed difference between the pump wheel and the turbine wheel to almost zero.

In one embodiment, the bridging clutch is configured integrally with the hydrodynamic torque converter, wherein a first friction element is formed on the pump wheel and a second on the turbine wheel. An axial pressure force for pressing the friction elements together may use a fluid which builds up a hydraulic pressure in the region of one of the friction elements under the influence of centrifugal force.

BACKGROUND

Friction elements designed integrally with the pump wheel or turbine wheel normally have a low wall thickness and are therefore unfavorable for lying closely together. An axial pressure between the friction elements may therefore be uneven, whereby a local increase in pressure force can occur. In this region, the friction elements may become overheated, which can result in increased wear or permanent deformation of one of the friction coatings. Also, in this region, the fluid may be heavily thermally loaded, whereby it can also be damaged.

SUMMARY

The present disclosure provides an improved device for transmission of torque which overcomes these disadvantages.

In one embodiment, a device for transmitting torque comprises a pump wheel and a turbine wheel, which are arranged axial offset from each other on a common rotation axis, wherein the pump wheel and the turbine wheel can be hydrodynamically coupled to each other by means of a fluid. A first friction element is attached to the pump wheel in a torque-transmitting fashion and a second friction element is attached to the turbine wheel in a torque-transmitting fashion, wherein the friction elements are designed to be pressed against each other axially in order to produce a frictional engagement. One of the friction elements is attached to its assigned wheel in an axially movable manner.

In one embodiment, the axially movable friction element may be configured as a blade. The friction element may be dimensioned or configured independently of its assigned wheel, so that for example a stiffness or material strength can be selected to be improved such that the frictional engagement between the friction element and the other friction element can be produced evenly. An axial pressure on the friction elements may thus be distributed in improved fashion on a periphery around the rotation axis. The friction engagement between the friction elements may also be distributed over the periphery in improved fashion, so that the friction elements may have improved durability. Also, the opening and closing behavior of the bridging clutch formed by the friction elements may be improved. A friction contact face between the friction elements may here be configured flat, conical or spherical. The axially movable friction element may be adapted in improved fashion to a form of the pump wheel or turbine wheel.

In one embodiment, the device comprises an elastic axial pressure element which is arranged between the axially movable friction element and its assigned wheel. In one embodiment, the pressure element itself is deformable in axially elastic fashion. For example, the pressure element may comprise a plate with an L-shaped cross section, running around the rotation axis. In another embodiment, the axial pressure element may rest for example on a peripheral plate which is fixedly connected to the assigned wheel. In this case, the pressure element may for example be configured as an O-ring. The O-ring may be held in the radial direction in an axial groove of the peripheral plate.

In one embodiment, the pressure element is configured to lie on the axially movable friction element over a linear contact running around the rotation axis. This is a pressure application point which is preferably configured as a peripheral linear contact. The distribution of the axially active force of the pressure element in the radial direction onto the friction element may thus be improved.

In a further embodiment, several radially offset linear contacts may also be provided running around the rotation axis. For example, two linear contacts may be provided with different radii. It may be favorable here to form the axial height of the linear contacts differently. Preferably, radially outer linear contacts lie axially closer to the other friction element than radially inner linear contacts. The pressure force of the pressure element on the friction element may thereby be further improved In yet a further embodiment, the axial pressure element is formed such that the linear contact expands radially outward as the axial pressure force between the friction elements rises. For this, the axial pressure element may comprise a plate running around the rotation axis and having a radial portion, wherein the radial portion is configured so as to be axially elastic. Also, the radial portion is formed such that a linear contact results between it and the axially movable friction element. As the pressure force rises, the radial portion is deformed such that the linear contact expands radially outward. In particular, the bridging clutch comprising the friction elements may thus close more evenly or smoothly.

In one embodiment, the torque-transmitting engagement between the moveable friction element and its assigned wheel is created by toothing. The toothing may alternatively be configured radially or axially. The axial movability of the friction element may be ensured with a simultaneously good torque-transmitting engagement.

In another embodiment, the pressure element is arranged on its assigned wheel in torque-transmitting fashion, and the torque-transmitting engagement between the movable friction element and the wheel runs through the pressure element. A toothing can act between the friction element and the pressure element, such that the pump or turbine wheel need not be provided with toothing. The design, structure and assembly of the pump or turbine wheel may therefore be uninfluenced by the design of the bridging clutch. In further embodiments, the torque-transmitting engagement between the movable friction element and the wheel may also run via another element which is preferably connected to the wheel in torque-transmitting fashion.

In one embodiment, the pressure element may be attached to its assigned wheel in torque-transmitting fashion and formed such that it fulfils a further function on the device. This function may for example be to receive or support an elastic element via which a torque can be introduced or transmitted. The elastic element may comprise a cylinder spring or a bow spring.

In one embodiment, a friction coating is provided on at least one of the friction elements. The friction or wear behavior of the friction element may thus be improved.

In one embodiment, the device is configured to run in a fluid bath. The fluid may comprise a fluid which may also be used for hydrodynamic coupling of the pump wheel to the turbine wheel.

BRIEF DESCRIPTION OF THE DRAWINGS

The present disclosure is now described in more detail with reference to the attached figures in which.

DETAILED DESCRIPTION

Figure 1A:
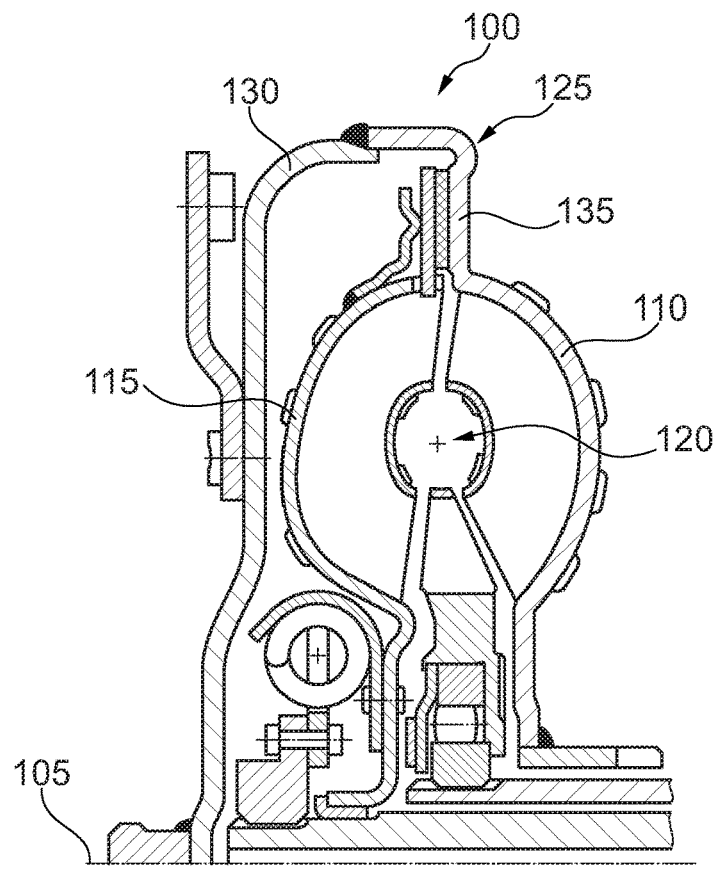
FIGS. 1A and 1B show a hydrodynamic torque converter.
Figure 1B:
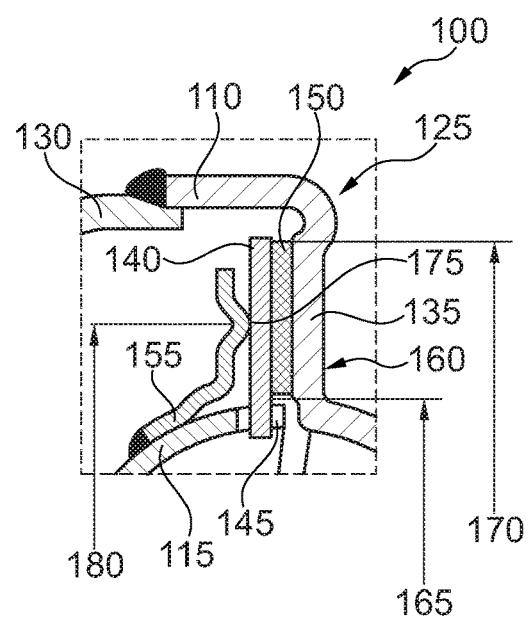

FIGS. 1A and 1B show a hydrodynamic torque converter 100. Specifically, FIG. 1A shows a half section through the torque converter 100, and FIG. 1B shows a detail of the torque converter 100 from FIG. 1A.

The torque converter 100 has a rotation axis 105 about which a pump wheel 110 and a turbine wheel 115 are rotatably arranged, axially offset from each other. The pump wheel 110 and the turbine wheel 115 are referred to below jointly as wheels 110, 115. A fluid 120 may be introduced into a region between the wheels 110, 115 in order to achieve a hydrodynamic coupling of the wheels 110, 115. To guide the fluid 120, further elements may be provided which are depicted merely in exemplary fashion in FIG. 1A and not discussed further here.

A bridging clutch 125 is integrated with the wheels 110, 115 and is configured to produce a friction engagement in order to reduce a rotation speed difference between the pump wheel 110 and the turbine wheel 115. The bridging clutch 125 preferably acts only when the wheels 110, 115, and in particular the pump wheel 110, are rotating about the rotation axis 105 with a sufficiently high speed. The bridging clutch 125 is preferably arranged on a radial outside of the region in which the fluid 120 is exchanged between the pump wheel 110 and the turbine wheel 115 in order to transmit a torque. Preferably, the bridging clutch 125 is arranged fluidtightly between a housing 130, which extends radially inward from the pump wheel 110, and the turbine wheel 115. At high rotation speeds, fluid 120 can collect in this space, which then exerts a hydraulic pressure on the bridging clutch 125 in order to close this.

The bridging clutch 125 comprises a first friction element 135 assigned to the pump wheel 110 and connected thereto in a torque-transmitting fashion, and a second friction element 140 assigned to the turbine wheel 115 and connected thereto in a torque-transmitting fashion. In the embodiment shown, the first friction element 135 is designed integrally with the pump wheel 110. In another embodiment, the first friction element 135 may not be designed integrally. The second friction element 140 is designed separately and, in the embodiment shown, is coupled to the turbine wheel 115 in torque-transmitting fashion by means of a toothing 145. Preferably, a friction coating 150 is provided on one of the friction elements 135, 140. An axial pressure element 155 is configured to press the second friction element 140 axially against the first friction element 135. A friction contact face 160 between the friction elements 135 and 140 may be configured flat, conical or spherical in different embodiments. In the present embodiment, the friction contact face 160 is flat and extends in a rotation plane around the rotation axis 105. In the radial direction, the friction contact face 160 is limited between an inner radius 165 and outer radius 170. A pressure application point 175 between the pressure element 155 and the second friction element 140 preferably lies on a radius 180 which lies between the radii 165 and 170 of the friction contact face 160. It is furthermore preferred here that the pressure application point 175 is configured as a circle on a periphery around the rotation axis 105, so that a peripheral linear contact results. The pressure element 155 is supported in the axial direction against the turbine wheel 115, for which a weld connection was selected in the present exemplary embodiment. The elastic pressure force of the pressure element 155 is implemented by an axial elastic deformability of the pressure element 155. In other embodiments, an elastic pressure element 155 acting purely axially may be used, which rests on a stiff or elastic element arranged on the turbine wheel 115. For example, the pressure element 155 may comprise an O-ring which is held in a groove formed on a holding element which, in one embodiment, has substantially the shape of the pressure element 155 depicted in FIG. 1B.

The basic function of the bridging clutch 125 of FIG. 1 may be varied in many ways. In particular, instead of the second friction element 140, the first friction element 135 may be configured axially movably. Further variations are explained briefly with reference to the following FIGS. 2 to 10. It should be noted that the features presented individually may in principle be combined with each other and with other above-mentioned exemplary embodiments.

Figure 2:
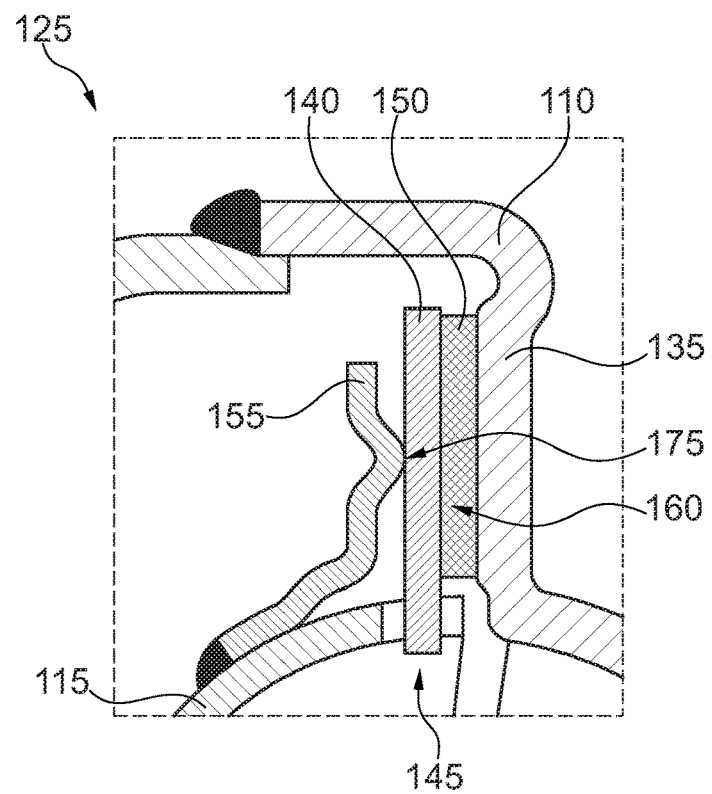
FIGS. 2-10 show exemplary embodiments of an integrated axial bridging clutch of the torque converter of FIGS. 1A and 1B.

The embodiment shown in FIG. 2 substantially corresponds to that of FIG. 1B. The details can be seen more clearly because of the enlarged depiction and the omission of some reference signs.

Figure 3:
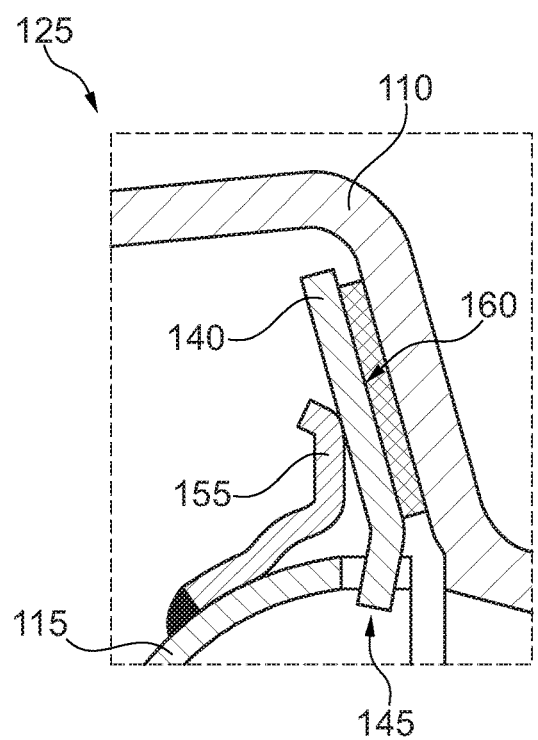

In the embodiment of FIG. 3, the friction contact face 160 is tilted relative to the rotary axis 105 in cross-section, so that as a whole it assumes a frustoconical form. However, as in the embodiment shown as in FIG. 2, the toothing 145 on the second friction element 140 extends in a purely radial direction.

Figure 4:
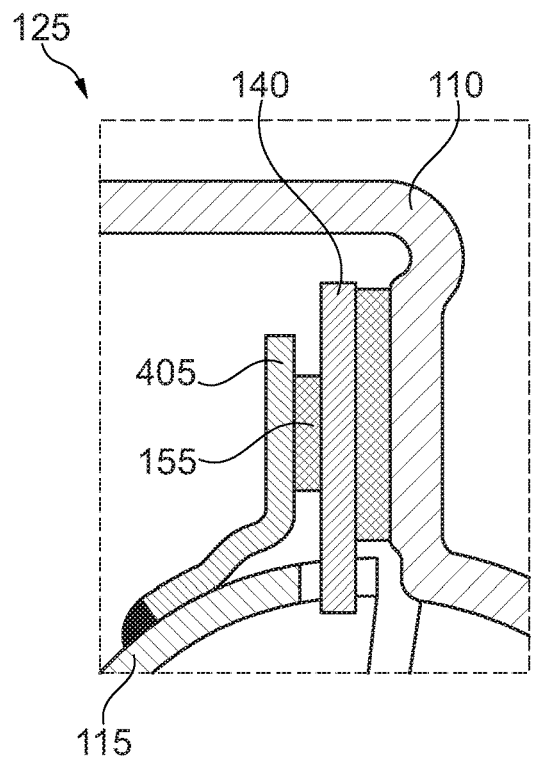

In the embodiment of FIG. 4, instead of the pressure element 155 of the embodiments of FIGS. 1 to 3, a support element 405 of similar form is provided. The pressure element 155 is provided axially between the support element 405 and the second friction element 140, and may for example comprise a rubber or elastomer product. The support element 405 may have a peripheral groove around the rotation axis 105 for fixing the pressure element 155. The pressure element 155 extends in the radial direction between the radii 165 and 170 of the friction contact face 160, as depicted in FIG. 1B. In comparison with the above-mentioned embodiments, the pressure element 155 may however be formed so as to be wider, whereby a more even distribution of the axial pressure force on the second friction element 140 can be achieved. Also, the fluid-tightness between the turbine wheel 115 and the second friction element 140 can be improved by the wider pressure element 155.

Figure 5:
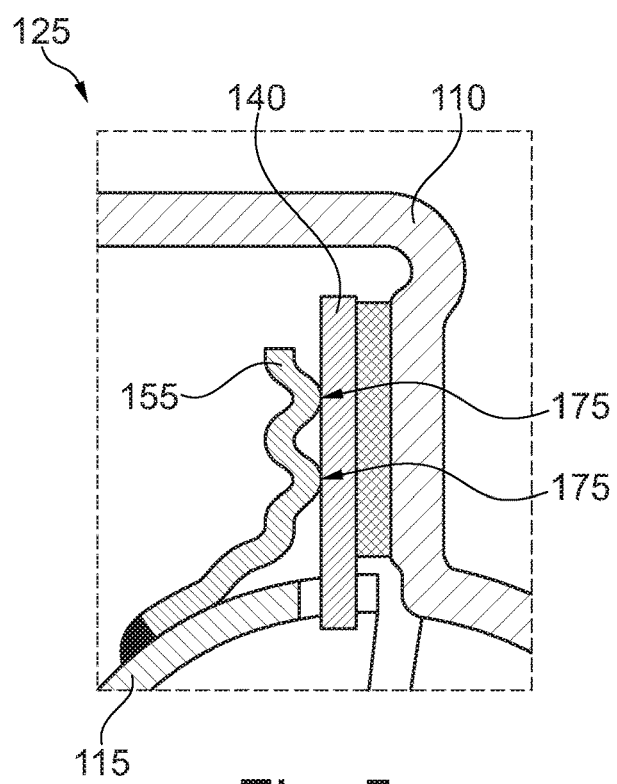

In the embodiment of FIG. 5, two pressure application points 175 are provided between the pressure element 155 and the second friction element 140. The two pressure application points 175 are radially offset and preferably both fall in the region between the radii 165 and 170. The radially outermost pressure application point 175 may lie axially closer to the second friction element 140 than the radially innermost one. The pressure application points 175 shown again form linear contacts which run around the rotation axis 105. In further embodiments, three or more pressure application points 175 are also possible. In yet a further embodiment, the pressure element 155 may be formed such that the pressure application point 175 is moved radially outward as the axial load of the pressure element 155 rises. It should however remain in the region between the radii 165 and 170.

Figure 6:
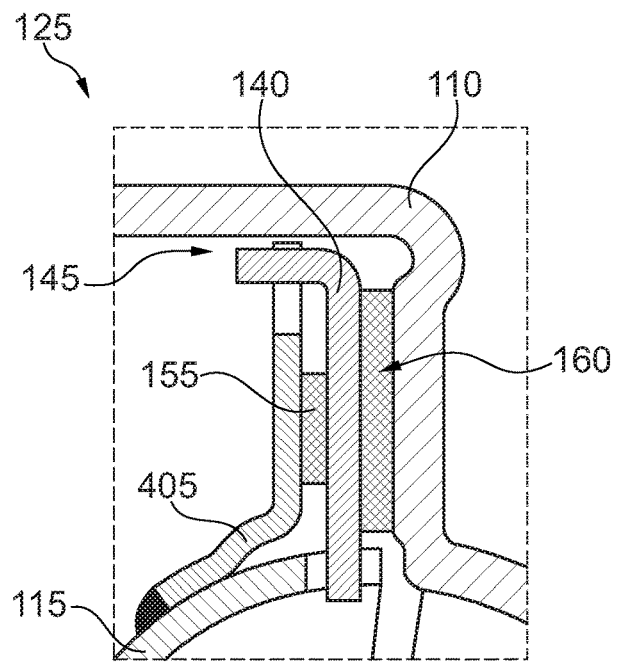

In the embodiment of FIG. 6, torque is transmitted between the turbine wheel 115 and the second friction element 140 via the support element 405. For this, the toothing 145 is provided between the second friction element 140 and the support element 405. Purely as an example, the toothing 145 lies radially outside the friction contact face 160. In other embodiments, the torque may, alternatively or additionally, be guided through the pressure element 155.

Figure 7:
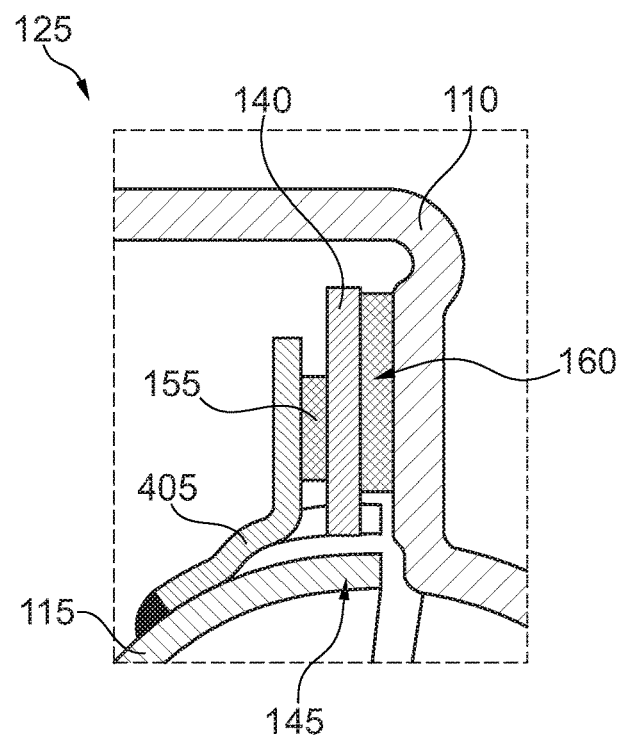

FIG. 7 shows a further embodiment in which the torque is not transmitted directly between the second friction element 140 and the turbine wheel 115. Here, the toothing 145 is however provided radially inside the friction contact face 160, in contrast to the embodiment of FIG. 6.

Figure 8:
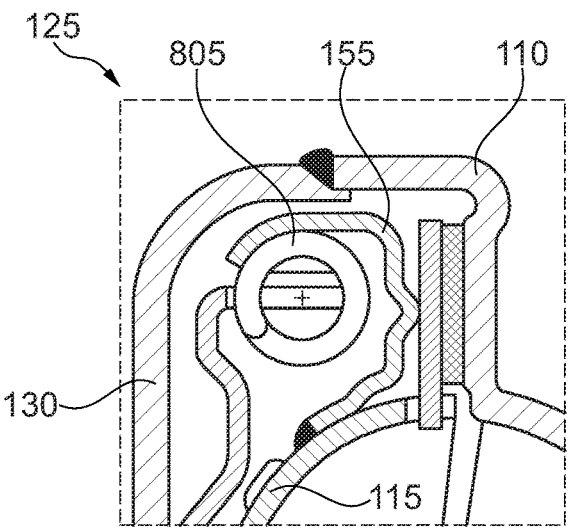

In the embodiment of FIG. 8, the pressure element 155 is formed such that it can perform a further function. In the embodiment shown, in particular it serves for radial holding and/or torque transmission to an elastic element 805 which acts on a periphery around the rotation axis 105. The elastic element 805 may comprise a cylinder or bow spring and serve for introducing or transmitting a torque.

Figure 9:
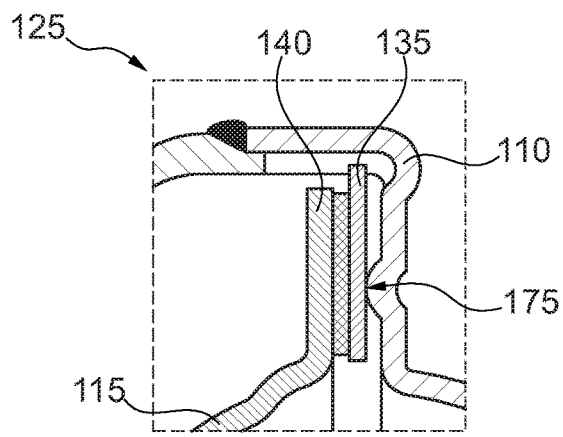
Figure 10:
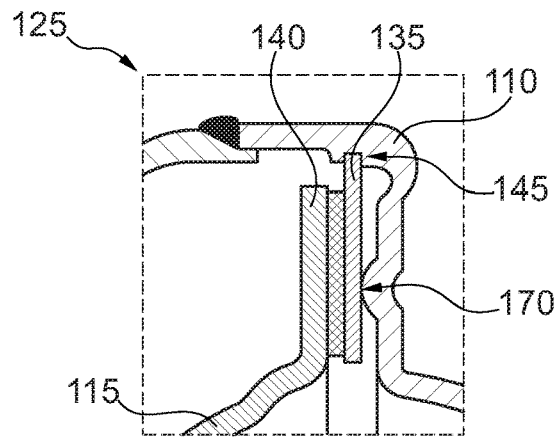

FIGS. 9 and 10 show embodiments in which, instead of the second friction element 140, the first friction element 135 is configured axially movably. Here, the first friction element 135 transmits at least part of the torque introduced by the second friction element 140 via an additional connection to the pump wheel 110, for example via the toothing 145 shown, or also for example via a calking, a weld or another connection.

LIST OF REFERENCE SYMBOLS

100 Device for transmitting torque
105 Rotation axis
110 Pump wheel
115 Turbine wheel
120 Fluid
125 Bridging clutch
130 Housing
135 First friction element
140 Second friction element
145 Toothing
150 Friction coating
155 Pressure element
160 Friction contact face
165 Inner radius
170 Outer radius
175 Pressure application point/linear contact
180 Radius
405 Support element
805 Elastic element

The invention claimed is:

1. A torque converter, comprising:
a pump;
a turbine fluidly connected to the pump;
a clutch including a first friction element attached to the pump and a second friction element attached to the turbine, wherein the first friction element and the second friction element are configured to frictionally engage with each other;
a pressure element disposed between the second friction element and the turbine, wherein the pressure element is configured to press the second friction element axially against the first friction element to engage the clutch; and
a support element connected to the turbine, wherein the pressure element is arranged on the support element, wherein the pressure element is an O-ring held in a radial direction in an axial groove of the support element.

2. The torque converter as claimed in claim 1, wherein the pressure element is configured to contact the second friction element, wherein a linear contact is formed therebetween.

3. The torque converter as claimed in claim 1, wherein the second friction element includes a toothing portion extending radially inward, and wherein frictional engagement between the friction elements is created in part by the toothing portion.

4. The torque converter as claimed in claim 1, wherein a friction coating is provided on one of the friction elements.

5. The torque converter of claim 1, wherein the first friction element and the second friction element form a friction contact face therebetween, the friction contact face being flat, conical, or spherical.

6. The torque converter of claim 1, wherein the pressure element is deformable.

7. The torque converter of claim 1, wherein the pressure element includes a radial portion configured to be axially elastic and form a linear contact between the radial portion and the second friction element.

* * * * *